US009824202B2

(12) United States Patent
Wegener

(10) Patent No.: US 9,824,202 B2
(45) Date of Patent: Nov. 21, 2017

(54) ELECTRONIC ACCESS-PROTECTION SYSTEM, METHOD OF OPERATING A COMPUTER SYSTEM, CHIP CARD AND FIRMWARE COMPONENT

(71) Applicant: Fujitsu Technology Solutions Intellectual Property GmbH, München (DE)

(72) Inventor: Mario Wegener, Bobingen (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 19 days.

(21) Appl. No.: 14/399,364

(22) PCT Filed: May 3, 2013

(86) PCT No.: PCT/EP2013/059247
§ 371 (c)(1),
(2) Date: Nov. 6, 2014

(87) PCT Pub. No.: WO2013/178426
PCT Pub. Date: Dec. 5, 2013

(65) Prior Publication Data
US 2015/0154393 A1    Jun. 4, 2015

(30) Foreign Application Priority Data

May 15, 2012   (DE) .................. 10 2012 104 228

(51) Int. Cl.
*G06F 21/34*         (2013.01)
*G06F 21/57*         (2013.01)
(Continued)

(52) U.S. Cl.
CPC ............ *G06F 21/34* (2013.01); *G06F 9/4415* (2013.01); *G06F 21/123* (2013.01); *G06F 21/572* (2013.01); *G06F 21/60* (2013.01)

(58) Field of Classification Search
CPC ...... G06F 21/572; G06F 21/123; G06F 21/60; G06F 9/4415
See application file for complete search history.

(56) References Cited

U.S. PATENT DOCUMENTS 7,805,720 B2 *   9/2010   Chang ..................... G06F 9/445
                                                       717/173
8,984,539 B2 *   3/2015   Mulcahy ............... G06F 9/4415
                                                       719/318
(Continued)

FOREIGN PATENT DOCUMENTS

EP         0 991 033 A2      4/2000

OTHER PUBLICATIONS

Lu et al., "A New Secure Communication Framework for Smart Cards", 2009, pp. 1-5.*

(Continued)

*Primary Examiner* — Thaddeus Plecha
(74) *Attorney, Agent, or Firm* — DLA Piper LLP (US)

(57) ABSTRACT

An electronic access protection system for a computer system includes an access-protected apparatus having a firmware component and a data processing device that executes program code of the firmware component; a reading device coupled to the apparatus that reads chip cards; and at least one chip card having at least one chip-card-specific access procedure, wherein a predetermined memory area of the at least one chip card stores first information concerning the at least one chip-card-specific access procedure; and the at least one firmware component has executable program code that reads in and evaluates data from the at least one chip card and performs the at least one chip-card-specific access procedure for the at least one chip card on the basis of the first information stored in the first memory area.

14 Claims, 2 Drawing Sheets

(51) Int. Cl.
G06F 21/12 (2013.01)
G06F 21/60 (2013.01)
G06F 9/44 (2006.01)

(56) References Cited

U.S. PATENT DOCUMENTS

| | | |
|---|---|---|
| 2003/0236987 A1 | 12/2003 | Griffin et al. |
| 2005/0050366 A1 | 3/2005 | Kwok et al. |
| 2006/0010317 A1* | 1/2006 | Lee .................. G06F 21/572 |
| | | 713/2 |
| 2008/0052770 A1 | 2/2008 | Ali et al. |
| 2012/0284787 A1* | 11/2012 | Clemot ................ G06F 21/34 |
| | | 726/7 |
| 2013/0149996 A1* | 6/2013 | King .................... H04W 12/08 |
| | | 455/411 |

OTHER PUBLICATIONS

"Preboot Authentication," Wikipedia, Stand Dec. 21, 2011, URL: http://en.wikipedia.org/w/index.php?title=Preboot_authentication&oldid=467107067.
"PKCS #15 v1.1: Cryptographic Token Information Syntax Standard," RSA-Laboratories, Jun. 6, 2000.
"What Makes a Smart Card Secure?" White Paper of Smart Card Alliance Contactless and Mobile Payments Council, Oct. 2008, Publication No. CPMC-08002.
ISO/IEC 7816 Spezifikation; Teil 4, Jan. 15, 2005 (Abstract).
"AutoRun," http://www.Wikipedia.org, Oct. 29, 2008.

* cited by examiner

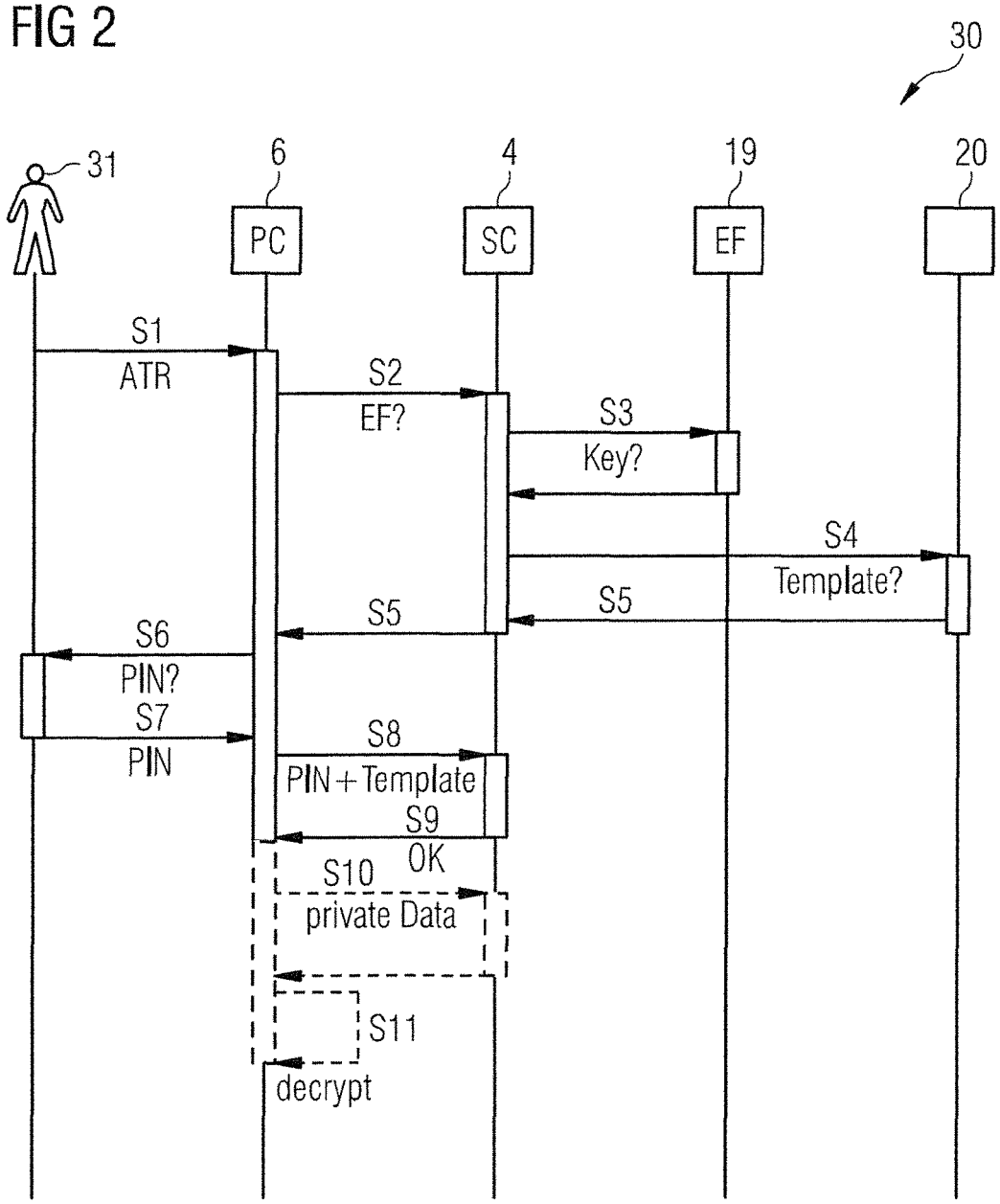

ELECTRONIC ACCESS-PROTECTION SYSTEM, METHOD OF OPERATING A COMPUTER SYSTEM, CHIP CARD AND FIRMWARE COMPONENT

TECHNICAL FIELD

This disclosure relates to an electronic access protection system for a computer system or the like and a method of operating a computer system, a chip card and a firmware component.

BACKGROUND

Chip-card-based electronic access protection systems for computer systems are known. In particular, the practice of granting access to a computer system or similar device only when a password that is input by a user, for example, what is known as a personal identification number (PIN), has been successfully verified by a data processing apparatus of the chip card is known.

If electronic access protection needs to be executed when a computer system is actually started, the problem arises that a firmware component used for starting such as particularly a BIOS program of a computer system, needs to be set up for data interchange with the chip card reader or a chip card inserted into the chip card reader. This results in relatively high complexity for the firmware component.

The complexity of the firmware component increases further still if not just one but rather different chip card types with different access procedures need to be used to implement the access protection. In practice, a multiplicity of different chip card types with different access procedures specific to the respective chip card have become established. Conditioning a firmware component to a plurality of or even all the chip card types and access procedures on the market is usually not possible or very cost- and error-intensive in practice for reasons of the limited storage capacity of the firmware component or the time involvement required for producing conditioned firmware code.

It could therefore be helpful to provide a simple and at the same time flexible electronic access protection system for a computer system or the like and the components required therefor and suitable methods of operation.

SUMMARY

I provide an electronic access protection system for a computer system including an access-protected apparatus having a firmware component and a data processing device that executes program code of the firmware component; a reading device coupled to the apparatus that reads chip cards; and at least one chip card having at least one chip-card-specific access procedure, wherein a predetermined memory area of the at least one chip card stores first information concerning the at least one chip-card-specific access procedure; and the at least one firmware component has executable program code that reads in and evaluates data from the at least one chip card and performs the at least one chip-card-specific access procedure for the at least one chip card on the basis of the first information stored in the first memory area.

I also provide a method of operating a computer system having a firmware component and an electronic reading device that reads chip cards, including recognizing, by the firmware component, a chip card introduced into the reading device; reading and evaluating first information, stored in a predetermined memory area of the at least one chip card, concerning at least one chip-card-specific access procedure; and performing the at least one chip-card-specific access procedure on the basis of the evaluated first information by the firmware component.

I further provide a chip card including at least one data processing apparatus, and at least one nonvolatile memory, wherein a predetermined memory area of the nonvolatile memory stores first information concerning at least one chip-card-specific access procedure such that the at least one chip-card-specific access procedure can be performed by a standard firmware component of a computer system including program code to read in and evaluate data from an arbitrary chip card when the computer system is started.

I further yet provide a non-transitory firmware component including program code for an electronic access protection system having at least one data processing apparatus, wherein the firmware component performs the steps, when the program code is executed by the at least one data processing apparatus recognizing a chip card introduced into a reading device of the access protection system, reading first information stored in a predetermined memory area of the at least one chip card concerning at least one chip-card-specific access procedure, evaluating the first information concerning the at least one chip-card-specific access procedure, and performing the at least one chip-card-specific access procedure on the basis of the evaluated first information by the firmware component.

BRIEF DESCRIPTION OF THE DRAWINGS

FIG. 2 shows a collaboration diagram for an access protection method.

LIST OF REFERENCE SYMBOLS

Figure 1:
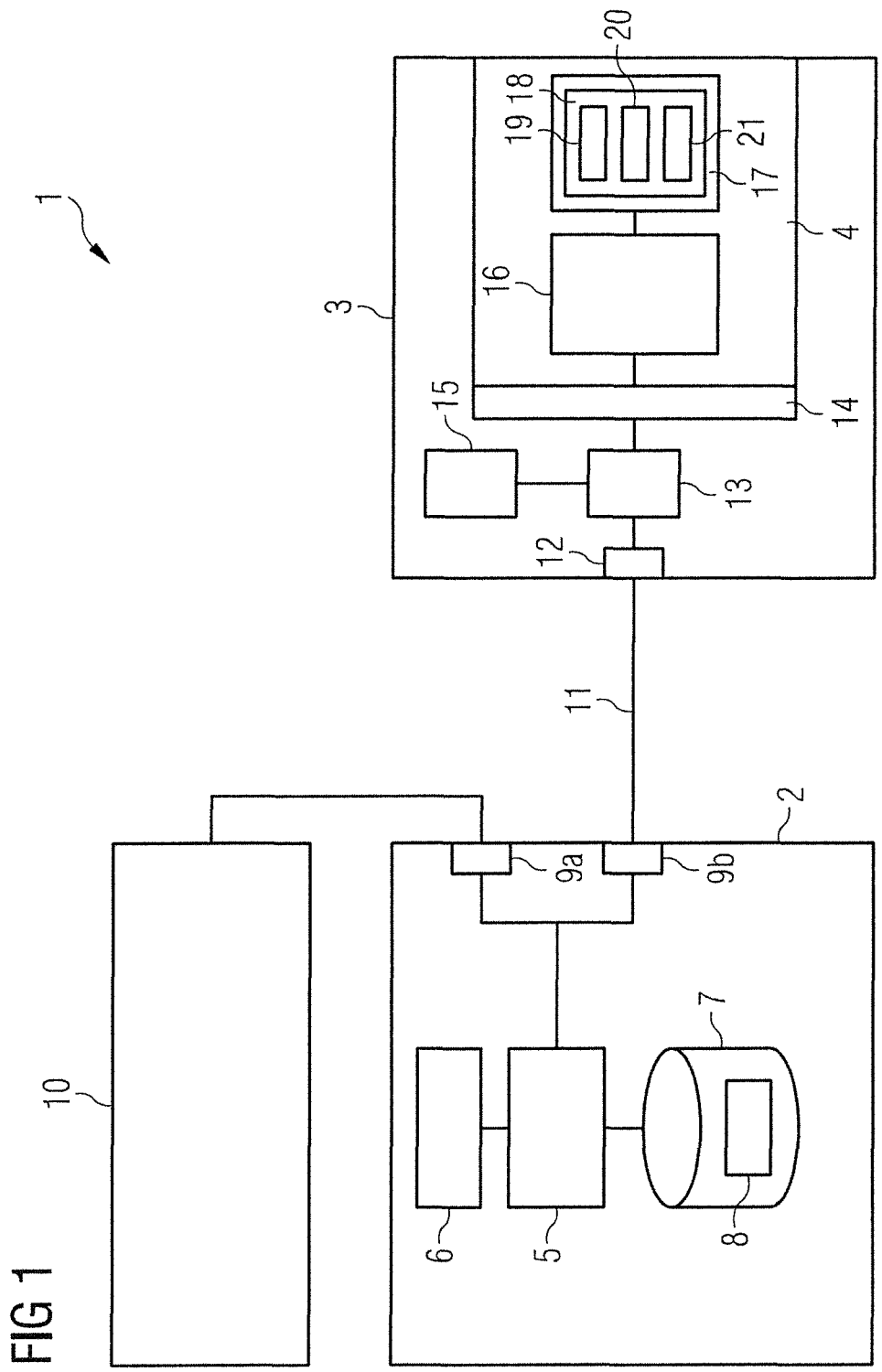
FIG. 1 shows a block diagram of an electronic access protection system.

1 Electronic access protection system
2 Computer system
3 Reading device
4 Chip card
5 Processor
6 Firmware component
7 Mass memory device
8 Operating system
9a First port
9b Second port
10 Keyboard
11 Connecting cable
12 USB port
13 Microcontroller
14 Chip card interface
15 Keyboard
16 Cryptocontroller
17 Nonvolatile memory
18 File system
19 First information object
20 Second information object
21 Third information object
30 Method
31 User

DETAILED DESCRIPTION

An electronic access protection system of the type in question may include a predetermined memory area of the at least one chip card stores first information concerning the at least one chip-card-specific access procedure. The at least one firmware component has executable program code to read in and evaluate data from the at least one chip card and is set up to perform the at least one chip-card-specific access procedure for the at least one chip card on the basis of the first information stored in the first memory area.

The provision of first information concerning at least one chip-card-specific access procedure and the provision of a firmware component set up to perform the chip-card-specific access procedure on the basis of the first data stored in the chip card allow modularization and hence flexibilization of the access protection system to be achieved.

In particular, information specific to a chip card type used is stored on the chip card itself, while other information, particularly program code to read in and evaluate data from an arbitrary chip card, is already integrated in the firmware. Taking account of the first information that the predetermined memory area contains, the firmware component is then able to perform a chip-card-specific access procedure.

By way of example, the chip-card-specific access procedures may be specific functions or commands to verify passwords or other protected data. Alternatively, they may be chip-card-specific functions or commands to read data stored on the chip card. By way of example, chip-card-specific access procedures in the form of smart card commands for what is known as an application protocol data unit (APDU) are defined in part 4 of the ISO/IEC 7816 specification.

Preferably, the first information is stored in a predetermined standard-compliant object of the chip card, particularly in a predetermined first information object from a predetermined system directory. The storage of first information in a predetermined standard-compliant object allows compatibility with a multiplicity of different chip cards to be achieved.

Advantageously, the first information contains a reference to second information stored in another memory area of the at least one chip card, wherein the second information contains data that performs the at least one chip-card-specific access procedure. An indirect approach of this kind allows flexibility concerning the storage of the data that performs the at least one chip-card-specific access procedure to be prompted.

Further advantageously, the second information is stored in a second information object—which is specific to the electronic access protection system—of the chip card, particularly in a cryptographic object from an application directory. In this case, the second information contains templates and/or parameters for commands to perform the at least one chip-card-specific access procedure, for example. The storage of templates and/or parameters for commands to perform at least one chip-card-specific access procedure in an information object specific to the electronic access protection system allows a particularly high degree of flexibility in the electronic access protection system to be achieved.

A method of operating a computer system or the like having a firmware component and having an electronic reading device for reading chip cards is described. The method may comprise the steps of:
  recognition, by the firmware component, of a chip card introduced into the reading device;
  reading and evaluation of first information, stored in a predetermined memory area of the at least one chip card, concerning at least one chip-card-specific access procedure; and
  performance of the at least one chip-card-specific access procedure on the basis of the evaluated first information by the firmware component.

Such a method allows implementation of a modular, flexible chip card system on the basis of a universal firmware component and an associated chip card. The method can be performed when a computer system actually starts, that is to say before execution of an operating system installed on the computer system.

The method may additionally comprise the step of grant of access to an access-protected apparatus by the firmware component if the chip-card-specific access procedure has been performed successfully and, otherwise, denial of access to the access-protected apparatus by the firmware component. The method is particularly suitable for setting up access protection for a computer system.

Advantageously, a data processing apparatus of the chip card is set up to read and evaluate the first information and take the first information as a basis for reading second information and transmitting it to the firmware component of the computer system. In this example, data that relate merely to the structure of the information stored on the chip card can be concealed from the firmware component.

Alternatively, the firmware component is set up to request and evaluate the first information from the chip card and take the evaluated first information as a basis to request and evaluate second information from the chip card. According to this example, it is possible to dispense with the provision of further data processing functions on the chip card.

A chip card and a firmware component are described that are suitable to implement the access protection system and perform the access protection method.

Further advantageous examples are specified in the detailed description below with reference to the Drawings.

FIG. 1 schematically shows an electronic access protection system 1 according to one example. The electronic access protection system 1 comprises a computer system 2 and also a reading device 3 connected to the computer system 2. An appropriate opening in the reading device 3 has had a chip card 4 inserted in the example shown.

By way of example, the computer system 2 is a standard desktop PC. Naturally, the computer system 2 may also be a server computer or another computer such as a laptop. In the illustration shown in FIG. 1, the computer system 2 has a central processor 5, a firmware component 6 and a mass memory device 7. By way of example, the firmware component 6 is a conventional BIOS or what is known as a BIOS based on the extensible firmware interface (EFI). By way of example, the mass memory device 7 may be an incorporated hard disk, what is known as a solid state disk (SSD) or another mass memory device. In the example, the mass memory device 7 stores an operating system 8 that operates the computer system 2. Furthermore, the computer system 2 in the example shown has two ports 9a and 9b that connect peripheral components. By way of example, these may be internal or external USB ports.

Finally, the system shown in FIG. 1 comprises an external keyboard 10 connected to the computer system 2 via the first USB port 9a. In the example, the keyboard 10 is used particularly to input PINS and other passwords. In the example shown, the keyboard 10 is the standard keyboard of the computer system 2 usually used to input information.

Naturally, the computer system 2 may comprise other or further components in different examples. Typically, the computer system 2 has particularly one or more expansion components, particularly to output information and access a data processing network. Such components are not required for the further explanation, however, and are therefore not shown in FIG. 1 for reasons of clarity.

In the example shown in FIG. 1, the reading device 3 is an external chip card reader and connects to the second port 9b of the computer system 2 via a connecting cable 11. In an alternative example, the reading device 3 is in the form of an internal chip card reader permanently integrated in the computer system 2 and connected to further components of the computer system 2 via an internal interface. In the shown, the reading device 3 comprises a USB port 12 and a microcontroller 13. The microcontroller 13 is used to interchange data between the computer system 2 and a chip card interface 14. Furthermore, the reading device 3 may optionally contain an incorporated keyboard 15. An incorporated keyboard 15 is particularly suitable for the secure input of PIN numbers or other passwords.

The chip card 4 inserted into the reading device 3 is particularly what is known as a smart card that authenticates a user. In the example, the chip card 4 comprises what is known as a cryptocontroller 16 and also a nonvolatile memory 17. The nonvolatile memory 17 contains a file system 18 that, as shown in the illustration in FIG. 1, stores three information objects 19 to 21. Naturally, the nonvolatile memory 17 and particularly the file system 18 may store further information, for example, firmware components and settings for the cryptocontroller 16 or for other chip card applications. These are not shown in FIG. 1, however, for reasons of clarity.

The cryptocontroller 16 is a specific microcontroller that monitors and if need be prevents the access to data in the nonvolatile memory 17 via the chip card interface 14. Furthermore, the cryptocontroller 16 can optionally perform further operations typical for a chip card, particularly performance of encryption and decryption methods and also authentication and authorization using key information that is stored in the file system 18.

The information objects 19 to 21 stored in the nonvolatile memory 17 of the chip card 4 are used for different tasks and functions. In the example, the first information object 19 is used particularly to store what is known as an elementary file (EF), as described in the standard "PKCS #15 v1.1: Cryptographic Token Information Syntax Standard," from RSA Laboratories, dated Jun. 6, 2000. An elementary file comprises data units or entries that share a common file name, also called a file identifier. The elementary file (EF) of the first information object 19 stores particularly references to other files in the file system 18. In the example described, these also include a reference to the second information object 20 specific to the electronic access protection system 1.

The second information object 20, which is an application-specific directory with further information files and further data contained in the directory, for example, stores information that relates to an access procedure specific to the chip card 4. In particular, the information block 20 may store a template for an authentication procedure for the chip card 4, which a user can use to self-authenticate to the computer system 2 as an authorized user.

The third information object 21 contains further data from the chip card 4 for use with other applications or to implement other functions. By way of example, the third information object 21 may contain a secret key to decrypt portions of or the whole content of the mass memory device 7.

In the example described, the aforementioned standard is taken as a basis to implement the access protection system 1 since it provides a certain amount of flexibility for storing cryptographic objects such as asymmetric keys and certificates. Hence, it provides the opportunity to store application-specific information in a largely standardized structure of the file system 18.

In practice, a multiplicity of chip card systems on the market are compatible with the aforementioned standard. Hence, the access protection system 1 described can be integrated into existing chip card systems particularly inexpensively. This merely requires the application-specific second information object 20 to be stored on existent chip cards 4 and an appropriate reference to be included in the first information object 19, which is existent anyway. Furthermore, the firmware component 6 needs to be set up once to retrieve and evaluate the stored information from the chip card 4. Fresh conditioning of the firmware component 6 when new or other chip cards 4 or access procedures are used is dispensed with, however. Hence, it is possible to use particularly a standard firmware component 6 on computer systems for use with different chip card systems.

To integrate the access protection system 1 described into existing chip card systems, an administrator of the chip card system can be provided with the required programs and data to write the second information object 20 and condition the first information object 19 by the manufacturer of a computer system 2. The administrator can then make existing chip cards 4 from the users that it looks after compatible with the firmware component 6 from new or already used computer systems 2 by loading the additional data.

The functional principle of an access protection method 30 is explained in more detail below with reference to the collaboration diagram shown in FIG. 2. By way of example, the method 30 can be performed using the electronic access protection system 1 shown in FIG. 1.

In a first step S1, a user 31 switches on the computer system 2, for example, by operating an appropriate switch-on key. For the purpose of authentication, a chip card 4 is introduced that has been issued for the user in the form of a smart card (SC) into the reading device 3 of the computer system 2. The chip card 4 can be introduced before or after the computer system 2 is switched on.

After the chip card 4 has been introduced and the computer system 2 switched on, the cryptocontroller 16 of the chip card 4 transmits what is known as an answer-to-reset (ATR) signal to the microcontroller 14 of the reading device 3, which microcontroller forwards the ATR signal to the computer system 2 via the USB port 12, the connecting cable 11 and the second USB port 9b. At this instant, the computer system 2 simultaneously executes program code stored in the firmware component 6 to initialize the computer system 2. In particular, the computer system executes BIOS functions to recognize and test hardware components existing in the computer system 2. In this "preboot execution environment" (PXE), it is also possible for further components of the firmware component 6 to be executed. In particular, the firmware component 6 in the example comprises program code to communicate with the reading device 3. This program code receives the ATR signal from the chip card 4 and then recognizes that a chip card 4 has been inserted into the reading device 3, and possibly a protocol used for data transmission.

In a subsequent step S2, the firmware component 6 attempts to access a first information object 19, provided on the basis of the aforementioned PKCS #15 standard, in the form of an elementary file (EF). The storage location and file name of the first information object 19 is regulated in the aforementioned standard so that access to the first information object 19 requires no further information on the part of the firmware component 6. When the first information object 19 is found, the firmware component 6 recognizes that a chip card 4 compatible with PKCS #15 is involved. If this is not the case, the method 30 ends unsuccessfully and the user is asked to insert another chip card 4 into the reading device 3, for example.

When the first information object 19 has been found, the first information object 19 is subsequently searched for information that refers to the second information object 20. In the example described, this is a further elementary file (EF) in an application-specific directory of the file system 18. A key entry for identifying the second information object 20 may be prescribed in a manner specific to the electronic access protection system 1, for example. If an appropriate entry is not found, the method 30 is terminated as described above and the user is possibly asked to insert an approved chip card 4.

When an appropriate entry is found, a subsequent step S4 involves the information stored in the second information block 20 being opened. By way of example, one or more cryptographic objects can be opened that are contained in the application-specific directory of the file system 18 and registered in the elementary file (EF) of the second information object 20. By way of example, the data contained therein comprise a template to perform an access procedure specific to the inserted chip card 4 to check the authentication of the user 31. For the purpose of implementing the card-specific access procedure, the ascertained second information object 20 is transmitted wholly or partly to the firmware component 6 of the computer system 2 in step S5.

An exemplary content of the second information object 20 is described in more detail below on the basis of APDU commands based on the ISO/IEC 7816 standard. In principle, APDU commands based on the standard are made up of a message header and a message content as follows:

| Header | Content (Body) |
|---|---|
| [CLA INS P1 P2] | [Lc] [Data] [Le] |

In this case, the placeholder CLA stands for "Class Byte," the placeholder INS stands for "Instruction Byte," the placeholder P1 stands for "Parameter Byte 1," the placeholder P2 stands for "Parameter Byte 2," the placeholder Lc stands for "Length of Data," that is to say the length of the data that follow, and the placeholder Le stands for "Length of Answer," that is to say the length of the expected answer.

Different possible interpretations of the APDU commands are demonstrated below using the example of the VERIFY command. In this case, the various formattings of the PIN should be noted. The byte Le is not needed for the PIN.

Examples of a VERIFY command with different formatting of the PIN are as follows:

[00 20 00 01][08][31 32 33 34 35 36 37 38]
PIN = "12345678" with ASCII coding
[00 20 00 01][08][01 02 03 04 05 06 07 08]
PIN = "12345678" with binary coding
[00 20 00 01][08][01 02 03 04 05 06 07 10]
PIN = "12345678" with octal coding
[00 20 00 73][04][31 32 33 34]
PIN = "1234" with ASCII coding
[00 20 00 02][08][31 32 33 34 FF FF FF FF]
PIN = "1234" with ASCII coding and a fixed length of eight characters, the unused characters being filled with the character $FF used as a padding byte.

A possible pattern for an APDU command template file is described below. By way of example, the template file may be a linear, binary elementary file (EF) that is organized in what is known as the TLV method (Type Length Value). As an application-specific type, hexadecimal bytes in the range from $A0 are agreed between the firmware component 6 and the access protection system. In this case, the commands are mapped with the following type bytes:

$B0 Template Block
    $A0 VERIFY
    $A1 READ BINARY
    $A2 READ RECORD
$B1 relative path from the starting directory to the elementary file (EF) with the relevant useful data.

The following subtypes are meant to apply for the description of the VERIFY command:

$81 APDU Header
$82 PIN Limits Minimum Length | Maximum Length
$83 PIN coding format:
    $01 binary
    $08 octal
    $11 binary-coded decimal number (BCD)
    $0A ASCII
    $21 binary number in nibbles (half-byte or 4-bit coding)
$84 PIN Padding Byte For the other cited commands READ BINARY and READ RECORD, only the subtags $81—APDU Header— are used.

Hence, the following pattern for the VERIFY command is obtained for an ASCII-coded PIN with a length of between 4 and 8 digits:
A0 0D 81 04 00 20 00 01 82 02 04 08 83 01 0A For a binary-coded PIN with a length of between six and ten digits, on the other hand, the following pattern is obtained:
A0 0D 81 04 00 20 00 02 82 02 06 0A 83 01 01

For an ASCII-coded PIN with a fixed length of eight digits and a padding byte $FF, the following pattern is obtained:
A0 10 81 04 00 20 00 01 82 01 08 83 01 0A 84 01 FF As a result, a template file in the form of an elementary file (EF) for the cited three APDU commands may therefore have the following structure:

B0 2A (Template Block with a length of 42 bytes)
    A0 10 (VERIFY description with a length of 16 bytes)
        81 04 (Header with 4 bytes)
            00 20 00 01
        82 01 (PIN length)
            08 (fixed length of 8 bytes)
        83 01 (Format)
            08 (ASCII-coded)
        84 01 (Padding byte)
            FF
    A1 06 (READ BINARY description with length of 6 bytes)
        81 05 (Header 5 bytes)
            00 W0 00 00 00
    A2 10 (READ RECORD description with length of 6 bytes)
        81 05 (Header 5 bytes)
            00 D0 00 00 00
    B1 04 (Relative path EF 4 bytes)
        32 00 24 01

The firmware component 6 evaluates the information that the chip card 4 contains and then requests data prescribed in the template such as a PIN number from the user 31 in step S6. By way of example, the user 31 can input the requested PIN number using the external keyboard 10 connected to the computer system 2 and transmits the PIN number back to the firmware component 6 of the computer system 2 in step S7. Instead of the PIN request described in the example, it is also possible for other user data to be requested for authentication. By way of example, it is also possible for a fingerprint or other biometric data from the user 31 to be requested via the computer system 2 and transmitted to the chip card 4 for authentication.

On the basis of the template that the second information object 20 contains and the data from the user 31 that are transmitted in step S7, the firmware component 6 produces a request specific to the chip card 4, for example, to authenticate the user 31 by the VERIFY command, in step S8. The request is then transmitted to the cryptocontroller 16 of the chip card 4 and processed by the cryptocontroller. If a check on a PIN is unsuccessful, for example, the negative result is transmitted back to the firmware component 6, which possibly asks the user 31 to reinput the correct PIN or other access data. The method 30 is then continued from step S6 again. Particularly if incorrect access data are input repeatedly, however, the cryptocontroller 16 can also permanently block or definitively erase the data stored in the nonvolatile memory 17 to prevent a manipulation attempt. In any case, the firmware component 6 prevents a further startup of the computer system 2 in this case.

If the request transmitted in step S8 results in successful authentication of the user 31 on the basis of the access data that has been input for use for the computer system 2, however, the cryptocontroller 16 sends an enable signal to the firmware component 6 in step S9. The firmware component then continues a boot process for the computer system 2, for example.

Optionally, the firmware component 6 reads in further user-specific data and/or templates from the chip card 4 in a subsequent step S10. In this case, it is also possible to use further chip-card-specific access procedures such as for the use of secret keys stored on the chip card 4.

By way of example, a third information object 21 with a secret key from the user 31 can be read in using a chip-card-specific command and used in a step S11 to decrypt data from the mass memory device 7. Following encryption of the mass memory device 7, the starting process for the computer system 2 is then continued by the firmware component 6. In particular, the latter can transfer control to an operating system 8 loaded from the mass memory device 7.

Optionally, the operating system 8 or application programs based thereon can likewise access the chip card 4 via an interface of the firmware component 6 and can use one or more chip-card-specific access procedures to authenticate the user 31 for security-relevant user actions or to execute other chip-card-specific functions.

Although the method 30 has been described in detail on the basis of the starting of access protection for a computer system 2, the access protection system 1 described and the method 30 described are also suitable for other fields of use, apparatuses and operating phases of different devices. By way of example, the method 30 can also be used for the use and checking of secret and public keys and signatures during operation of a computer system 2. Furthermore, the electronic access protection system 1 is also suitable for automatic access control for other apparatuses or devices on the basis of chip cards 4.

The invention claimed is:

1. An electronic access protection system for a computer system, comprising:
    an access-protected apparatus having a firmware component comprising executable program code and a data processing device that executes the program code of the firmware component;
    a reading device coupled to the apparatus that reads chip cards, wherein the reading device is an external or internal chip card reader of the computer system; and
    at least one chip card that stores information specific to a chip card kind of the at least one chip card, the information comprising at least one chip-card-specific access procedure;
wherein
    a predetermined standard-compliant object in the at least one chip card stores first information concerning the at least one chip-card-specific access procedure;
    the first information contains a reference to a second information stored in another memory area of the at least one chip card, wherein the second information contains data to perform the at least one chip-card-specific access procedure;
    the second information is stored in an information object of the chip card specific to the electronic access protection system;
    the second information contains at least one of templates and parameters for commands to perform the at least one chip-card-specific access procedure; and
    the executable program code of the firmware component reads in and evaluates data from the at least one chip card and performs the at least one chip-card-specific access procedure for the at least one chip card on the basis of the first information stored in the standard-compliant object and on the basis of the second information stored in the information object before execution of an operating system installed on the computer system.

2. The electronic access protection system for a computer system according to claim 1, in which the first information is stored in a predetermined first information object of a predetermined system directory.

3. The electronic access protection system for a computer system according to claim 1, in which the first information is stored in an information object compliant with the PKCS #15 Cryptographic Token Information Syntax Standard.

4. The electronic access protection system for a computer system according to claim 1, wherein the at least one chip-card-specific access procedure comprises specific functions or commands to verify passwords or other protected data, or wherein the at least one chip-card-specific access procedure comprises chip-card-specific functions or commands to read data stored on the at least one chip card.

5. The electronic access protection system for a computer system according to claim 1, wherein the at least one chip-card-specific access procedure is provided in the form of smart card commands for an application protocol data unit defined in accordance with part 4 of the ISO/IEC 7816 specification.

6. A method of operating a computer system having a firmware component and an electronic reading device that reads chip cards, wherein the reading device is an external or internal chip card reader of the computer system, the method comprising:
    recognizing, by the firmware component, a chip card introduced into the reading device, wherein the chip card stores information specific to a chip card kind of the chip card, the information comprising at least one chip-card-specific access procedure;

reading and evaluating first information, stored in a predetermined memory area of the recognized chip card, concerning the at least one chip-card-specific access procedure, in which the first information is read from a predetermined standard-compliant object or a predetermined information object from a predetermined directory of the chip card and contains a reference to second information stored in another memory area of the at least one chip card, wherein the second information contains data for the at least one chip-card-specific access procedure; and performing the at least one chip-card-specific access procedure on the basis of the evaluated first information and the second information by the firmware component before execution of an operating system installed on the computer system.

7. The method according to claim 6, further comprising:

granting access to an access-protected apparatus by the firmware component if the at least one chip-card-specific access procedure has been performed successfully and, otherwise, denying access to the access-protected apparatus by the firmware component.

8. The method according to claim 6, in which the steps of recognizing, reading, evaluating and performing are performed under control of a BIOS before the operating system of the computer system is loaded.

9. The method according to claim 6, in which a data processing apparatus of the chip card reads and evaluates the first information and, based on the evaluated first information, reads the second information and transmit the second information to the firmware component.

10. The method according to claim 6, in which the firmware component requests and evaluates the first information from the chip card and takes the evaluated first information as a basis to request and evaluate the second information from the chip card.

11. A chip card comprising:

at least one data processing apparatus, and at least one nonvolatile memory that stores information specific to a chip card kind of the chip card, the information comprising at least one chip-card-specific access procedure; wherein a predetermined memory area of the nonvolatile memory stores first information concerning the at least one chip-card-specific access procedure, the first information contains a reference to a second information stored in another memory area of the at least one chip card, the second information contains data to perform the at least one chip-card-specific access procedure, the second information being stored in an information object of the chip card specific to the electronic access protection system, and the second information contains at least one of templates and parameters for commands to perform the at least one chip-card-specific access procedure; such that the at least one chip-card-specific access procedure can be performed by a standard firmware component of a computer system comprising program code to read in and evaluate data from an arbitrary chip card when the computer system is started.

12. The chip card according to claim 11, wherein the at least one data processing apparatus comprises a cryptocontroller.

13. The chip card according to claim 11, wherein the chip card complies with the ISO/IEC 7816 standard.

14. A firmware component having non-transitory memory comprising program code for an electronic access protection system having at least one data processing apparatus, wherein the firmware component performs the following steps, when the program code is executed by the at least one data processing apparatus:

recognizing a chip card introduced into a reading device of the access protection system, wherein the reading device is an external or internal chip card reader of the data processing system, and wherein the chip card stores information being specific to a chip card kind of the chip card, the information comprising at least one chip-card-specific access procedure;

reading first information stored in a predetermined memory area of the recognized chip card concerning the at least one chip-card-specific access procedure, wherein the first information contains a reference to a second information stored in another memory area of the chip card, and the second information contains data to perform the at least one chip-card-specific access procedure;

evaluating the first information concerning the at least one chip-card-specific access procedure; and performing the at least one chip-card-specific access procedure on the basis of the evaluated first information and the second information by the firmware component before execution of an operating system installed on a computer system.

* * * * *